(12) United States Patent
Busser et al.

(10) Patent No.: US 8,688,976 B2
(45) Date of Patent: Apr. 1, 2014

(54) METHOD FOR ISSUING A DIGITAL CERTIFICATE BY A CERTIFICATION AUTHORITY, ARRANGEMENT FOR PERFORMING THE METHOD, AND COMPUTER SYSTEM OF A CERTIFICATION AUTHORITY

(75) Inventors: Jens-Uwe Busser, München (DE); Steffen Fries, Baldham (DD)

(73) Assignee: Siemens Aktiengesellschaft, Munich (DE)

( * ) Notice: Subject to any disclaimer, the term of this patent is extended or adjusted under 35 U.S.C. 154(b) by 80 days.

(21) Appl. No.: 13/389,108

(22) PCT Filed: Jul. 6, 2010

(86) PCT No.: PCT/EP2010/059629
§ 371 (c)(1),
(2), (4) Date: Feb. 6, 2012

(87) PCT Pub. No.: WO2011/015414
PCT Pub. Date: Feb. 10, 2011

(65) Prior Publication Data
US 2012/0137129 A1    May 31, 2012

(30) Foreign Application Priority Data
Aug. 5, 2009 (DE) .......... 10 2009 036 179

(51) Int. Cl.
*H04L 29/06* (2006.01)
(52) U.S. Cl.
USPC ........... 713/156; 713/183; 713/184; 713/169; 380/278; 455/450

(58) Field of Classification Search
USPC .......... 713/156, 184, 169, 170; 726/2, 26–27; 455/450
See application file for complete search history.

(56) References Cited

U.S. PATENT DOCUMENTS

| | | | |
|---|---|---|---|
| 6,993,651 B2 | 1/2006 | Wray et al. | 713/151 |
| 7,240,195 B2* | 7/2007 | Furukawa | 713/156 |
| 7,930,554 B2* | 4/2011 | Coulier et al. | 713/184 |
| 8,327,143 B2* | 12/2012 | Ilyadis | 713/170 |
| 8,503,376 B2* | 8/2013 | Cha et al. | 370/329 |

(Continued)

FOREIGN PATENT DOCUMENTS

EP    1549019 A1    6/2005    ............. H04L 29/06

OTHER PUBLICATIONS

Qiang Huang, Fast Authenticated Key Establishment, May 2003, ACM, vol. 03, pp. 141-150.*

(Continued)

*Primary Examiner* — Cordelia Zecher
*Assistant Examiner* — Viral Lakhia
(74) *Attorney, Agent, or Firm* — King & Spalding L.L.P.

(57) ABSTRACT

In a method for issuing a digital certificate by a certification authority (B), a device (A) sends a request message to the certification authority (B) for issuing the certificate, the certification authority (B) receives the request message and sends a request for authenticating the device (A) to the device (A), the device (A) sends a response to the certification authority (B) in response to the received request, and the certification authority (B) checks the received response and generates the certificate and sends the certificate to the device (A), if the response was identified as correct.

16 Claims, 1 Drawing Sheet

(56) References Cited

U.S. PATENT DOCUMENTS

| | | | | |
|---|---|---|---|---|
| 2003/0088772 | A1 | 5/2003 | Gehrmann et al. | 713/175 |
| 2004/0015692 | A1* | 1/2004 | Green et al. | 713/169 |
| 2006/0253703 | A1* | 11/2006 | Eronen et al. | 713/156 |
| 2007/0087756 | A1* | 4/2007 | Hoffberg | 455/450 |
| 2008/0301461 | A1* | 12/2008 | Coulier et al. | 713/184 |
| 2009/0158031 | A1* | 6/2009 | Wan et al. | 713/156 |
| 2009/0209232 | A1* | 8/2009 | Cha et al. | 455/411 |
| 2009/0265544 | A1* | 10/2009 | Moona et al. | 713/156 |
| 2011/0055585 | A1* | 3/2011 | Lee | 713/183 |

OTHER PUBLICATIONS

German Office Action, German Patent Application No. 10 2009 036 179.0-31, 4 pages, Jun. 11, 2010.

International PCT Search Report and Written Opinion, PCT/EP2010/059629, 17 pages, Oct. 25, 2010.

Krawczyk, H., "HMQV: A High-Perforrnance Secure Diffie-Hellman Protocol", Advances in Cryptology, pp. 546-566, Jan. 1, 2005.

Menezes, P., et al., "Chapter 10: Identification and Entity Authentication", Chapter from the Handbook of Applied Cryptography, pp. 385-424, Oct. 1, 1996.

Menezes, P., et al., "Chapter 12: Key Establishment Protocols" Chapter from the Handbook of Applied Cryptography, pp. 489-541, Oct. 1, 1996.

Nystrom, M., et al., "PKCS #10: Certification Request Syntax Specification", version 1.7, The Internet Society, Network Working Group, Request for Comments, 14 pages, Nov. 2000.

Schneier, B., "Applied Cryptography, Protocols, Algorithms and Source Code in C". Book, Second Edition; pp. 513-521, 1996.

\* cited by examiner

METHOD FOR ISSUING A DIGITAL CERTIFICATE BY A CERTIFICATION AUTHORITY, ARRANGEMENT FOR PERFORMING THE METHOD, AND COMPUTER SYSTEM OF A CERTIFICATION AUTHORITY

CROSS-REFERENCE TO RELATED APPLICATIONS

This application is a U.S. National Stage Application of International Application No. PCT/EP2010/059629 filed Jul. 6, 2010, which designates the United States of America, and claims priority to DE Patent Application No. 10 2009 036 179.0 filed Aug. 5, 2009. The contents of which are hereby incorporated by reference in their entirety.

TECHNICAL FIELD

The invention relates to a method for issuing a digital certificate by a certification authority, to an arrangement for performing the method, and to a computer system of a certification authority.

BACKGROUND

When security parameters are initially set up for devices, a process also often referred to as "bootstrapping", a key pair comprising a public and a private key is typically generated by a device itself. The public key can be signed by a certificate issuing agency, also often referred to as a Certification Authority (or CA for short) by means of a request message which is usually embodied in the form of a Certificate Signing Request (for short also: CSR or Certificate Request). The Certificate Signing Request cited is defined in RSC 2986, PKCS#10. The certificate is then sent to the device and can subsequently be used in security applications, for example in order to authenticate the device to an infrastructure. The term "device" shall be understood here and in the following description to mean any component and any service that are considered as suitable candidates for certification by a certification authority.

In conventional present-day methods for issuing a digital certificate by a certification authority, a public key PubKey_A generated by the device is sent by means of a CSR signed by the device with a private key PK_A generated by it to the certification authority. By verifying the signature the certification authority checks whether the device which sent the CSR is in possession of the corresponding private key PK_A. In addition device data can also be sent as part of the CSR in what are termed attributes, although said data cannot be verified by the certification authority.

However, it is often not enough merely to verify whether the device which sent a CSR is also in possession of the corresponding private key. This is because in this way it is only possible to check whether a device is able to send a signed CSR, as sent by original devices. The originality or authenticity of the device itself cannot, however, be checked by means of the methods that are customary today. A frequently employed countermeasure to deal with this problem is to transport the CSR in a secure manner, in other words, for example, through a physically separate network or by trusted service personnel on data media, such as USB sticks for example, so that in this way certificates are only generated by the certification authority for authentic CSRs and consequently for original devices.

SUMMARY

According to various embodiments, a method for issuing a digital certificate by a certification authority can be provided wherein the authenticity of the device is also checked before the certificate is generated and sent. According to various embodiments a suitable arrangement can be provided for performing the method as well as a certification authority computer system which is suitable for performing the method on the certification authority side.

According to an embodiment, in a method for issuing a digital certificate by a certification authority, a device sends a request message for the issuing of the certificate to the certification authority, the certification authority receives the request message and sends a challenge to the device for the purpose of authenticating the device, the device sends a response to the certification authority in answer to the received challenge, and the certification authority checks the received response and generates and sends the certificate to the device if the response was identified as correct.

According to a further embodiment, the authentication of the device can be based on a challenge-response method. According to a further embodiment, before sending the request message the device may generate a key pair comprising a first private key and a first public key and the request message contains the first public key and is signed with the first private key of the device. According to a further embodiment, the challenge can be based on a random number. According to a further embodiment, the generation of the challenge and response can be based on a Diffie-Hellman method. According to a further embodiment, the certification authority may generate a random number y that is known only to the certification authority and sends a first value $Y=g^y$ as challenge to the device, where g is a generator in accordance with the Diffie-Hellman method, the device calculates a second value $Y^x$ from the received challenge Y and sends said second value $Y^x$ as response to the certification authority, where x is a third value that is known only to the device, and the certification authority calculates a fourth value $X^y$, where $X=g^x$ is a fifth value that is known both to the device and to the certification authority, compares the calculated fourth value $X^y$ with the received second value $Y^x$ and sends the certificate to the device if the second and the fourth value match. According to a further embodiment, the third value x acts as a second private key of the device and the fifth value $X=g^x$ acts as a second public key of the device. According to a further embodiment, the device may possess a further digital certificate for the second public key X and the request message contains said further certificate. According to a further embodiment, a further public key of the certification authority may be known to the device and the request message is sent to the certification authority via an HTTPS connection. According to a further embodiment, a further public key of the certification authority may be known to the device and the request message is sent to the certification authority encrypted with the public key of the certification authority.

According to another embodiment, an arrangement for performing a method as described above, may comprise a device for sending a request message for the issuing of a digital certificate, for receiving a challenge for authentication purposes, and for sending a response in answer to the received challenge, and a certification authority for receiving the request message, for sending a challenge for authentication purposes, for checking the received response, and for generating and sending the certificate if the response is identified as correct.

According to a further embodiment of the arrangement, the device has an authentication chip in which the second private and the second public key of the device are stored.

According to yet another embodiment, a computer system of a certification authority, which computer system is embodied and programmed for performing the method as described above on the certification authority side, may comprise a receive module for receiving request messages and responses, a transmit module for sending challenges for authentication purposes and a digital certificate, a check module for checking the responses, and a certification module for generating the certificate.

BRIEF DESCRIPTION OF THE DRAWINGS

Further features and advantages will emerge from exemplary embodiments which are explained below with reference to the drawings, in which.

DETAILED DESCRIPTION

Figure 1:
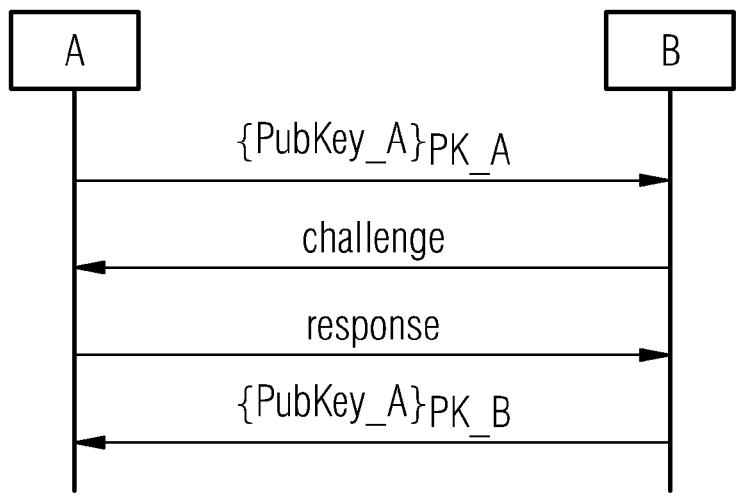
FIG. 1 shows a signal diagram of a first embodiment variant of the method.

According to various embodiments, in a method for issuing a digital certificate by a certification authority, a device sends a request message for the issuing of the certificate to the certification authority, the certification authority receives the request message and sends a challenge to the device for the purpose of authenticating the device, the device sends a response to the certification authority in answer to the received challenge, and the certification authority checks the received response and generates and sends the certificate to the device if the response was identified as correct.

By incorporating a dialog segment for the purpose of authenticating the device, said dialog segment consisting of challenge and response and advantageously being based on a challenge-response method, it is ensured with a high degree of probability that a certificate will be issued only to original or authentic devices and not, for instance, to bogus entities. In contrast to the known methods, however, no secure second transmission path is required for this. As a result of the embodiment of the method it is made considerably more difficult to mount so-called man-in-the-middle attacks, since a potential attacker must now additionally be able to answer the challenge sent by the certification authority with a correct response in order to obtain a certificate.

According to an embodiment, prior to sending the request message the device generates a key pair comprising a first private key and a first public key, integrates said first public key into the request message and signs the request message using the first private key. In this way the request message acquires the form of a Certificate Signing Request, as defined in RFC2986, PKCS#10.

If the challenge, which advantageously constitutes a challenge within the context of a challenge-response method, is based on a random number, the probability of manipulation can be reduced further.

According to a further embodiment the generation of the challenge and response is based on a Diffie-Hellman method. This asymmetric key establishment method ensures a further increase in the standard of security and has the advantage over symmetric encryption methods that no preconfiguration of the certification authority is required. It should, however, be expressly pointed out that in addition to the Diffie-Hellman method it is also possible to use asymmetric encryption methods or alternatively thereto also symmetric encryption methods for the various embodiments.

Another embodiment variant provides that the certification authority will generate a random number y that is known only to the certification authority and send a first value $Y=g^y$ as challenge to the device, where g is a generator in accordance with the Diffie-Hellman method. The device then calculates a second value $Y^x$ from the received challenge Y and sends said second value $Y^x$ as response to the certification authority, where x is a third value that is known only to the device. Finally, the certification authority calculates a fourth value $X^y$, where $X=g^x$ is a fifth value that is known both to the device and to the certification authority, compares said calculated fourth value $X^y$ with the received second value $Y^x$ and sends the certificate to the device if the second and the fourth value match.

A secure—because difficult to attack—authentication of the device in the context of a CSR is realized by means of this data communication based on the Diffie-Hellman method.

In this scheme the third value x acts as a second private key of the device and the fifth value $X=g^x$ acts as a second public key of the device. If the device possesses a digital certificate for the second public key X, it is advantageous to integrate said certificate into the request message. This avoids the requirement for the certification authority to know the second public key X in advance.

If a public key of the certification authority is known to the device, then according to a further embodiment the request message for the issuing of the certificate can be sent to the certification authority via an HTTPS connection. Through the use of a unilaterally authenticated HTTPS connection it is ensured that the device can send the request message to the desired certification authority only. In addition it is ensured that the respective communication partner cannot change during the certification dialog. Alternatively the device can encrypt the request message directly using the public key of the certification authority and send it to the certification authority.

According to further embodiments, an arrangement may comprise a device for sending a request message for the issuing of a digital certificate, for receiving a challenge for authentication purposes, and for sending a response in answer to the received challenge, and having a certification authority for receiving the request message, for sending a challenge for authentication purposes, for checking the received response, and for generating and sending the certificate if the response is identified as correct.

According to an embodiment the device has an authentication chip in which the second private and public key are stored. Chips of said type are already used for example for conventional protection against cloning. They thus represent a simple means of equipping a device with the second keys required for authentication purposes.

According to yet other embodiments, a certification authority computer system may be embodied and programmed for performing the method according to various embodiments on the certification authority side and for that purpose comprises a receive module for receiving request messages and responses, a transmit module for sending challenges for authentication purposes and a digital certificate, a check module for checking the responses, and a certification module for generating the certificate.

According to the first embodiment shown in FIG. 1, a device A first sends a request message, in the form of a CSR conforming to RFC2986 for example, to a certification authority B, the request message containing, in the case of an CSR, a first public key PubKey_A of the device A and being signed with a first private key PK_A of the device A. These first keys were generated by the device A itself in advance of the communication. If a public key of the certification authority B is known to the device A, the connection to the certification authority B can be established via a unilaterally authenticated HTTPS connection. After receiving the request message the certification authority B sends a challenge to the device A for the purpose of authenticating the device A. Said challenge constitutes the challenge part within the context of a challenge-response method. If the latter is based for example on a Diffie-Hellman method, a first value $Y=g^y$ can be sent as the challenge, where g is a generator in accordance with the Diffie-Hellman method and y is a random number that is known only to the certification authority B.

In answer to the received challenge the device sends back a response, which constitutes the response part within the context of a challenge-response method, to the certification authority B. If the challenge-response method is based on a Diffie-Hellman method, the device calculates a second value $Y^x$ from the received challenge Y and sends said second value $Y^x$ back as response to the certification authority B. In this case x is a third value that is known only to the device. Said third value is advantageously stored in an authentication chip provided in the device.

The certification authority B now checks the received response and generates and sends the certificate to the device if the response is identified as correct. In this case the certificate includes the first public key that was signed by the certification authority B. In the case of the Diffie-Hellman approach described by way of example the check is implemented in that the certification authority B calculates a fourth value $X^y$, where $X=g^x$ is a fifth value that is known both to the device A and to the certification authority B, compares said calculated fourth value $X^y$ with the received second value $Y^x$ and sends the certificate in the form of the first public key PubKey_A of the device A signed by means of a private key PK_B of the certification authority B to the device A only if the second and the fourth value match. The certificate issued by the certification authority can then also contain the second public key X for validating the authenticity of the device in addition to the first public key PubKey_A.

It should be pointed out once again that the described authentication method based on the Diffie-Hellman method is to be regarded simply as proposed by way of example. All that is required for the method according to various embodiments is for a challenge sent to the device A by the certification authority B to be answered with a correct response by the device A, thereby verifying the authenticity of the device A.

Figure 2:
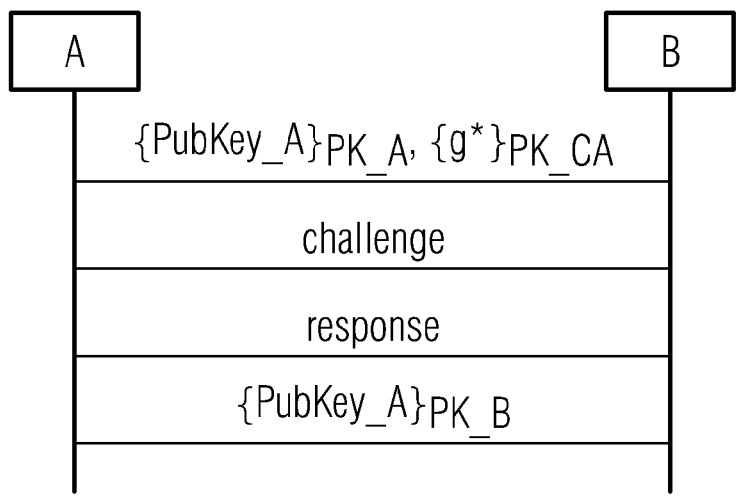
FIG. 2 shows a signal diagram of a second embodiment variant of the method.

The only difference between the second embodiment variant of the method shown in FIG. 2 and the embodiment variant shown in FIG. 1 is that the request message also includes a certificate $\{g^x\}_{PK\_CA}$ for the second public key in addition to the first public key PubKey_A of the device A. In this regard the device A must obviously possess a certificate matching the second public key of the device A, which certificate may have been issued by the same certification authority B or even an arbitrary other, though of course trusted, certification authority CA. In this way it is no longer necessary for the certification authority B to know the second public key of the device A in advance of the communication.

What is claimed is:

1. A method for issuing a digital certificate by a certification authority, comprising:
    a device sending a request for the issuing of the digital certificate to the certification authority,
    the certification authority receiving the request message, generating a random number y known only to the certification authority and sending a first value $Y=g^y$ as a challenge to the device, where g is a generator in accordance with the Diffie-Hellman method,
    the device receiving the challenge, calculating a second value $Y^x$ from the received challenge Y, and sending said second value $Y^x$ to the certification authority as a response to the challenge, where x is a third value known only to the device, and
    the certification authority calculating a fourth value $X^y$, where $X=g^x$ is a fifth value known both to the device and to the certification authority, comparing the calculated fourth value $X^y$ with the second value $Y^x$ received from the device, and sending the digital certificate to the device if the second and fourth values match.

2. The method according to claim 1, wherein the authentication of the device is based on a challenge-response method.

3. The method according to claim 1, wherein before sending the request message the device generates a key pair comprising a first private key and a first public key and the request message contains the first public key and is signed with the first private key of the device.

4. The method according to claim 1, wherein the challenge is based on a random number.

5. The method according to claim 1, wherein the third value x acts as a second private key of the device and the fifth value $X=g^x$ acts as a second public key of the device.

6. The method according to claim 5, wherein the device possesses a further digital certificate for the second public key X and the request message contains said further digital certificate.

7. The method according to claim 1, wherein a further public key of the certification authority is known to the device and the request message is sent to the certification authority via an HTTPS connection.

8. The method according to claim 1, wherein a further public key of the certification authority is known to the device and the request message is sent to the certification authority encrypted with the public key of the certification authority.

9. An arrangement for issuing a digital certificate by a certification authority, comprising
    a device for sending a request message for the issuing of a digital certificate, for receiving a challenge for authentication purposes, and for generating and sending a response in answer to the received challenge, and
    a certification authority for receiving the request message, for generating and sending a challenge for authentication purposes, for checking the received response, and for generating and sending the digital certificate if the response is identified as correct,
    wherein the certification authority and the device are programmed to generate the challenge and the response, respectively, based on a Diffie-Hellman method, in which:
        the certification authority generates a random number y known only to the certification authority and sends a first value $Y=g^y$ as the challenge to the device, where g is a generator in accordance with the Diffie-Hellman method,
        the device calculates a second value $Y^x$ from the received challenge Y and sends said second value $Y^x$ as the response to the certification authority, where x is a third value known only to the device, and
        the certification authority calculates a fourth value $X^y$, where $X=g^x$ is a fifth value known both to the device and to the certification authority, compares the calculated fourth value $X^y$ with the received second value $Y^x$, and sends the digital certificate to the device if the second and fourth values match.

10. The arrangement according to claim 9, wherein the device has an authentication chip in which the second private and the second public key of the device are stored.

11. A computer system of a certification authority, the computer system comprising logic instructions embodied in non-transitory computer-readable media and executable by a processor to:
- receive from a device a request for the issuing of a digital certificate,
- generate a random number y known only to the certification authority and sending a first value $Y=g^y$ as a challenge to the device, where g is a generator in accordance with the Diffie-Hellman method,
- receive from the device a response to the challenge, the received response comprising a second value $Y^x$, where x is a third value known only to the device, and
- calculate a fourth value $X^y$, where $X=g^x$ is a fifth value known both to the device and to the certification authority,
- compare the calculated fourth value $X^y$ with the second value $Y^x$ received from the device, and
- send the digital certificate to the device if the second and fourth values match.

12. The arrangement according to claim 9, wherein the authentication of the device is based on a challenge-response method.

13. The arrangement according to claim 9, wherein the device is configured before sending the request message to generate a key pair comprising a first private key and a first public key and the request message contains the first public key and is signed with the first private key of the device.

14. The arrangement according to claim 9, wherein the challenge is based on a random number.

15. The arrangement according to claim 9, wherein the third value x acts as a second private key of the device and the fifth value $X=g^x$ acts as a second public key of the device.

16. The arrangement according to claim 15, wherein the device comprises a further digital certificate for the second public key X and the request message contains said further digital certificate.

* * * * *